United States Patent
Venugopal et al.

(10) Patent No.: US 12,058,712 B1
(45) Date of Patent: *Aug. 6, 2024

(54) APPLICATION OF UPLINK TRANSMISSION CONFIGURATION INDICATOR STATE WITH DOWNLINK REFERENCE SIGNAL TO CODEBOOK BASED TRANSMISSIONS

(71) Applicant: QUALCOMM Incorporated, San Diego, CA (US)

(72) Inventors: Kiran Venugopal, Green Brook, NJ (US); Yan Zhou, San Diego, CA (US); Tao Luo, San Diego, CA (US); Tianyang Bai, Somerville, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,532

(22) Filed: Apr. 24, 2023

Related U.S. Application Data

(63) Continuation of application No. 17/125,990, filed on Dec. 17, 2020, now Pat. No. 11,638,265.

(Continued)

(51) Int. Cl.
 *H04W 72/53* (2023.01)
 *H04B 7/01* (2006.01)
 (Continued)

(52) U.S. Cl.
 CPC .............. *H04W 72/53* (2023.01); *H04B 7/01* (2013.01); *H04B 7/0456* (2013.01); *H04L 5/0051* (2013.01); *H04L 25/0226* (2013.01)

(58) Field of Classification Search
 CPC .................. H04W 72/0493; H04B 7/01; H04B 7/0456; H04L 5/0051
 See application file for complete search history.

(56) References Cited

U.S. PATENT DOCUMENTS

| 10,397,940 B2 | 8/2019 | Krishnamoorthi et al. |
| 11,165,472 B2 | 11/2021 | Jung et al. |

(Continued)

FOREIGN PATENT DOCUMENTS

WO    2018022216    2/2018

OTHER PUBLICATIONS

Ericsson: "Remaining Issues on Beam Measurement and Reporting", 3GPP TSG-RAN WG1 Meeting #93, R1-1806217, 3rd Generation Partnership Project, Mobile Competence Centre, 650, Route Des Lucioles, F-06921 Sophia-Antipolis Cedex, vol. RAN WG1, No. Busan, Korea, May 21, 2018-May 25, 2018, May 20, 2018, pp. 1-13, XP051441426, May 12, 2018, Paragraphs 2.1.2 and 2.1.3, Paragraph [2.2.1], section 2, pp. 10-11, 2.3 Default QCL/Spatial Relation Assumptions.

(Continued)

*Primary Examiner* — Fahmida S Chowdhury
(74) *Attorney, Agent, or Firm* — Patterson & Sheridan, L.L.P/Qualcomm Incorporated

(57) ABSTRACT

Certain aspects of the present disclosure provide techniques for applying uplink transmission configuration indicator (TCI) states with downlink reference signals to codebook based physical uplink shared channel (PUSCH) transmissions. An example method generally includes receiving, from a network entity, signaling of an uplink transmission configuration indicator (TCI) state with a target codebook based uplink transmission signal, determining if the TCI state has a source downlink reference signal (RS) and deciding how to process the codebook based uplink transmission based on the determination.

20 Claims, 16 Drawing Sheets

Related U.S. Application Data

(60) Provisional application No. 62/951,729, filed on Dec. 20, 2019.

(51) Int. Cl.
*H04B 7/0456* (2017.01)
*H04L 5/00* (2006.01)
*H04L 25/02* (2006.01)

(56) References Cited

U.S. PATENT DOCUMENTS

| | | | |
|---|---|---|---|
| 2013/0272250 A1* | 10/2013 | Shimezawa | H04B 7/0639 370/329 |
| 2019/0053072 A1* | 2/2019 | Kundargi | H04W 16/28 |
| 2019/0181994 A1 | 6/2019 | Chen et al. | |
| 2019/0261338 A1 | 8/2019 | Akkarakaran et al. | |
| 2019/0320469 A1 | 10/2019 | Huang et al. | |
| 2019/0349964 A1* | 11/2019 | Liou | H04W 76/27 |
| 2021/0036822 A1* | 2/2021 | Lyu | H04L 5/0048 |
| 2021/0195602 A1 | 6/2021 | Venugopal et al. | |
| 2021/0392671 A1* | 12/2021 | Liu | H04L 5/0051 |
| 2022/0015118 A1* | 1/2022 | Park | H04W 72/046 |
| 2022/0022237 A1* | 1/2022 | Kim | H04L 5/0053 |
| 2022/0060223 A1* | 2/2022 | Jung | H04W 72/23 |
| 2022/0077969 A1* | 3/2022 | Kim | H04L 1/1861 |
| 2022/0225120 A1* | 7/2022 | Matsumura | H04L 5/0051 |
| 2022/0271873 A1 | 8/2022 | Gao et al. | |
| 2022/0360398 A1* | 11/2022 | Zhang | H04B 7/0695 |

OTHER PUBLICATIONS

International Preliminary Report on Patentability—PCT/US2020/065978, The International Bureau of WIPO—Geneva, Switzerland, Jun. 30, 2022.

International Search Report and Written Opinion—PCT/US2020/065978—ISA/EPO—Mar. 26, 2021.

Panasonic: "On Enhancements for Multi-Beam Operations for NR MIMO in Rel. 16", 3GPP TSG RAN WG1 #96,3GPP Draft; R1-1908975_PANASONIC_NR_MIMO_MULTI_BEAM_ ENHANCEMENTS_VFINAL, 3rd Generation Partnership Project (3GPP), Mobile Competence Centre; 650, Route Des Lucioles; F-06921 Sophia-Antipolis Cedex, vol. RAN WG1, No. Prague, CZ; Aug. 26, 2019-Aug. 30, 2019, Aug. 16, 2019 (Aug. 16, 2019), 5 Pages, XP051765579, the whole document.

Samsung: "Enhancements on Multi-Beam Operations", 3GPP TSG RAN WG1 96bis, 3GPP Draft; R1-1904450 R16 Multi-Beam, 3rd Generation Partnership Project (3GPP), Mobile Competence Centre, 650, Route Des Lucioles, F-06921 Sophia-Antipolis Cedex, France, vol. RAN WG1, No. Xi'an, China; Apr. 12, 2019-Apr. 16, 2019, Apr. 7, 2019 (Apr. 7, 2019), 11 Pages, XP051699704, the whole document.

* cited by examiner

| Valid UL-TCI state Configuration | Source (reference) RS | (target) UL RS | [qcl-Type ] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

FIG. 9

APPLICATION OF UPLINK TRANSMISSION CONFIGURATION INDICATOR STATE WITH DOWNLINK REFERENCE SIGNAL TO CODEBOOK BASED TRANSMISSIONS

CROSS-REFERENCE TO RELATED APPLICATIONS

This application is a continuation of U.S. patent application Ser. No. 17/125,990 filed Dec. 17, 2020, which claims benefit of and priority to U.S. Provisional Application No. 62/951,729, filed Dec. 20, 2019, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for applying uplink transmission configuration indicator (TCI) states with downlink reference signals to codebook based physical uplink shared channel (PUSCH) transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the subject matter described in this disclosure can be implemented in a method for wireless communication performed by a user equipment (UE). The method generally includes receiving, from a network entity, signaling of an uplink transmission configuration indicator (TCI) state for a target codebook based uplink transmission signal. The method generally includes determining if the TCI state has a source downlink reference signal (RS). The method generally includes deciding how to process the codebook based uplink transmission based on the determination.

Certain aspects of the present disclosure provide a method for wireless communication by a network entity. The method generally includes sending, to a UE, signaling of an uplink TCI state for a target codebook based uplink transmission signal. The method generally includes determining how the UE processed the codebook based uplink transmission, based on whether the TCI state has a source downlink RS. The method generally includes processing the codebook based uplink transmission in accordance with the determination.

Certain aspects of the subject matter described in this disclosure can be implemented in an apparatus for wireless communication. The apparatus generally includes at least one processor; and memory coupled to the at least one processor. The memory generally includes code executable by the at least one processor to cause the apparatus to receive, from a network entity, signaling of an uplink TCI state for a target codebook based uplink transmission signal. The memory generally includes code executable by the at least one processor to cause the apparatus to determine if the TCI state has a source downlink RS. The memory generally includes code executable by the at least one processor to cause the apparatus to decide how to process the codebook based uplink transmission based on the determination.

Certain aspects of the subject matter described in this disclosure can be implemented in an apparatus for wireless communication. The apparatus generally includes at least one processor; and memory coupled to the at least one processor. The memory generally includes code executable by the at least one processor to cause the apparatus to send, to a UE, signaling of an uplink TCI state for a target codebook based uplink transmission signal. The memory generally includes code executable by the at least one processor to cause the apparatus to determine how the UE processed the codebook based uplink transmission, based on whether the TCI state has a source downlink RS. The memory generally includes code executable by the at least one processor to cause the apparatus to process the codebook based uplink transmission in accordance with the determination.

Certain aspects of the subject matter described in this disclosure can be implemented in an apparatus for wireless communication. The apparatus generally includes means for receiving, from a network entity, signaling of an uplink transmission configuration indicator (TCI) state for a target codebook based uplink transmission signal. The apparatus generally includes means for determining if the TCI state has a source downlink RS. The apparatus generally includes means for deciding how to process the codebook based uplink transmission based on the determination.

Certain aspects of the present disclosure provide an apparatus for wireless communication. The apparatus generally includes means for send, to a UE, signaling of an uplink TCI state for a target codebook based uplink transmission signal. The apparatus generally includes means for determining how the UE processed the codebook based uplink transmission, based on whether the TCI state has a source downlink RS. The apparatus generally includes means for processing the codebook based uplink transmission in accordance with the determination.

Certain aspects of the subject matter described in this disclosure can be implemented in a computer readable medium storing computer executable code thereon for wireless communication. The computer readable medium generally includes code for receiving, from a network entity, signaling of an uplink TCI state for a target codebook based uplink transmission signal. The computer readable medium generally includes code for determining if the TCI state has a source downlink RS. The computer readable medium generally includes code for deciding how to process the codebook based uplink transmission based on the determination.

Certain aspects of the present disclosure provide a computer readable medium storing computer executable code thereon for wireless communication. The computer readable medium generally includes code for sending, to a UE, signaling of an uplink TCI state for a target codebook based uplink transmission signal. The computer readable medium generally includes code for determining how the UE processed the codebook based uplink transmission, based on whether the TCI state has a source downlink RS. The computer readable medium generally includes code for processing the codebook based uplink transmission in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 illustrates example quasi co-location (QCL) relationships, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
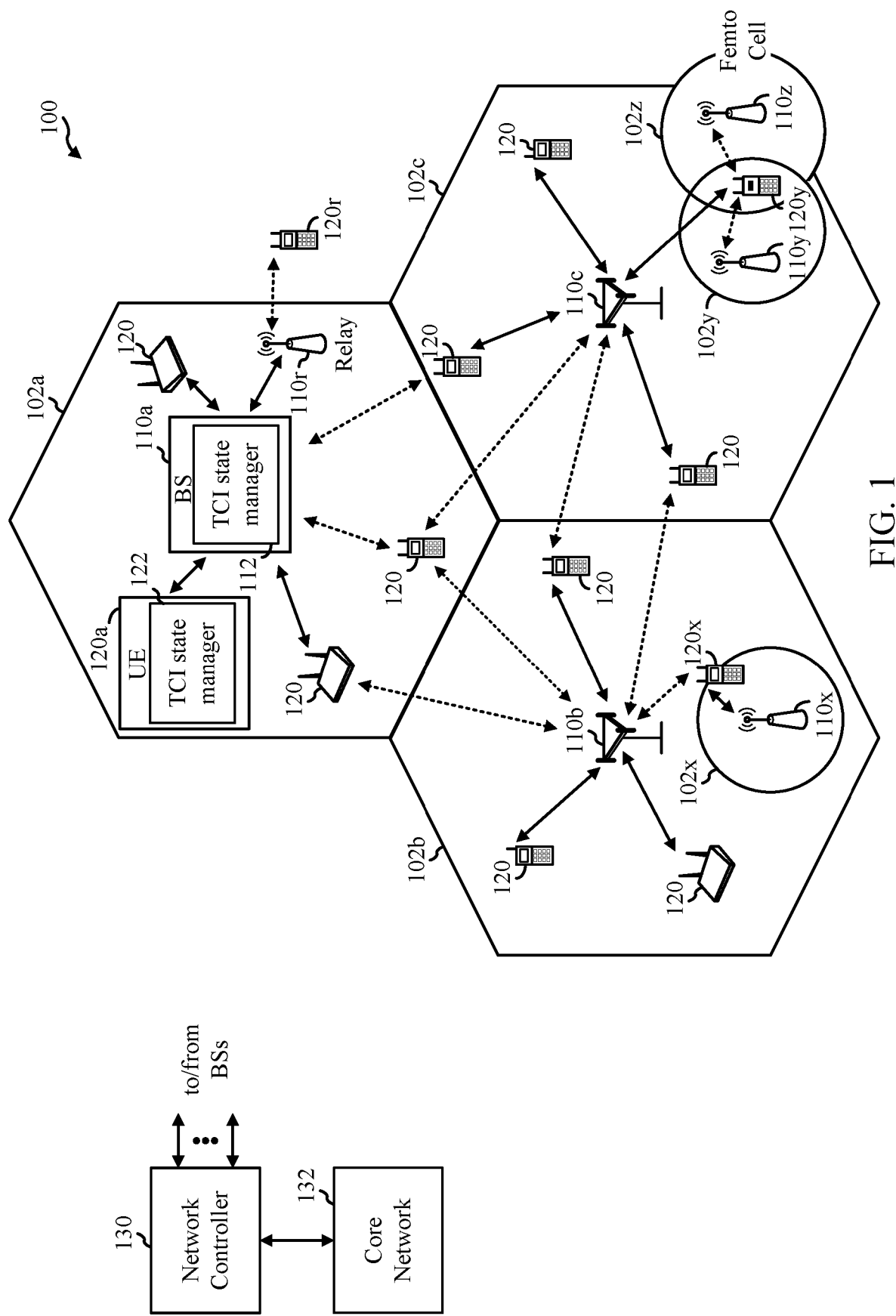
FIG. 1 is a block diagram conceptually illustrating an example telecommunications system, in accordance with certain aspects of the present disclosure.

Aspects of the present disclosure provide apparatus, methods, processing systems, and computer readable mediums for applying uplink transmission configuration indicator (TCI) states with downlink reference signals to codebook based physical uplink shared channel (PUSCH) transmissions.

The following description provides examples of applying uplink TCI states with downlink references signals to codebook based transmissions in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 (e.g., an NR/5G network), in which aspects of the present disclosure may be performed. For example, the wireless communication network 100 may include BSs 110 and UEs 120 configured to uplink TCI states with downlink references signals to codebook based transmissions. As shown in FIG. 1, the BS 110a includes a TCI state manager 112 that processes the codebook based uplink transmission in accordance with how the UE processed the codebook based uplink transmission, in accordance with aspects of the present disclosure. The UE 120a includes a TCI state manager 122 that decides how to process a codebook based uplink transmission based on if a TCI state has a source downlink reference signal (RS), in accordance with aspects of the present disclosure.

The wireless communication network 100 may be an NR system (e.g., a 5G NR network). As shown in 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS may provide communication coverage for a particular geographic area, sometimes referred to as a "cell", which may be stationary or may move according to the location of a mobile BS 110. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless network 100, and each UE may be stationary or mobile. Wireless communication network 100 may also include relay stations (e.g., relation station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120 to facilitate communication between devices.

A network controller 130 may couple to a set of BSs and provide coordination and control for these BSs (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
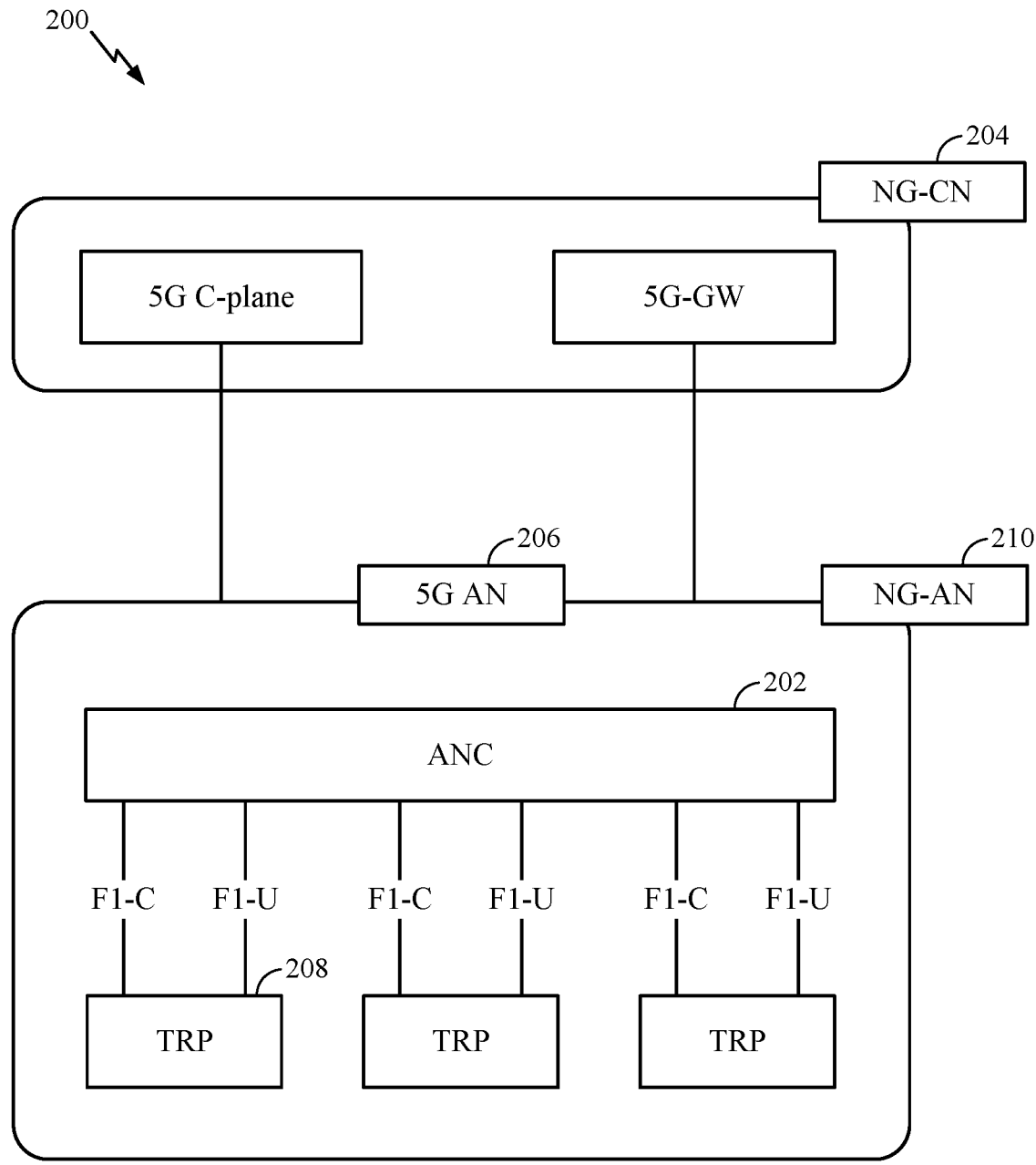
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
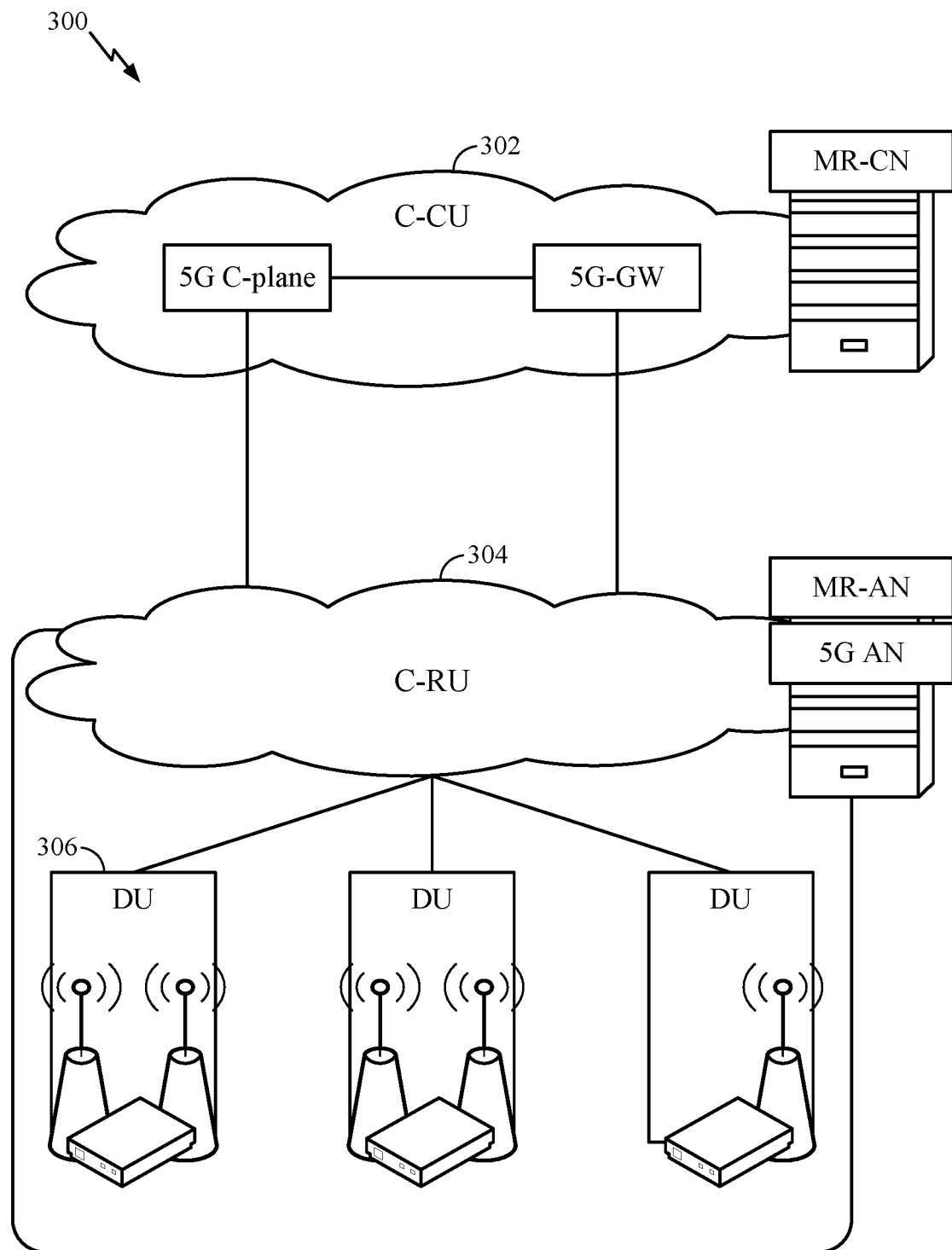
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
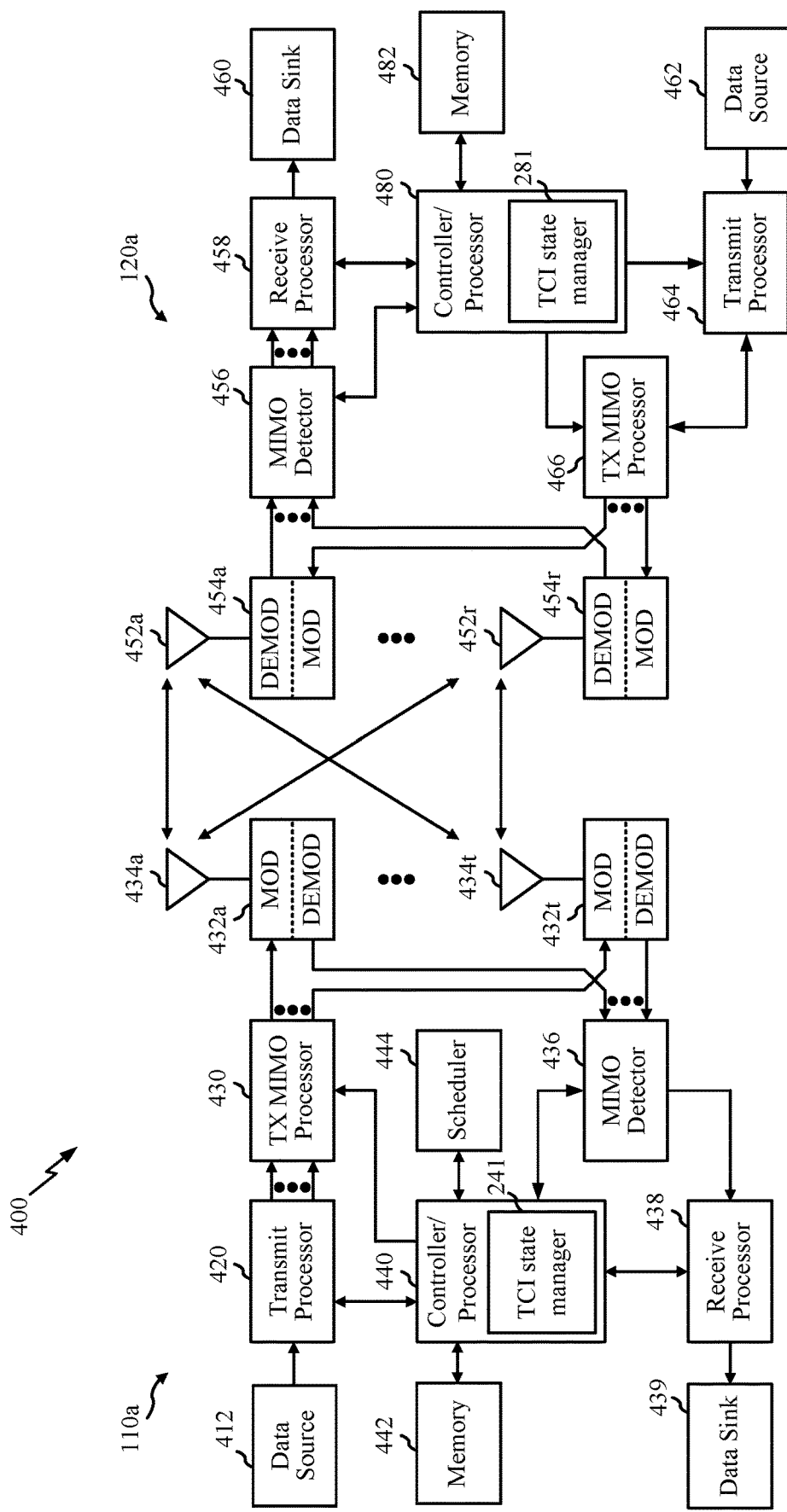
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a through 432t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a through 432t may be transmitted via the antennas 434a through 434t, respectively.

At the UE 120, antennas 452a through 452r may receive downlink signals from the base station 110 and may provide received signals to demodulators (DEMODs) in transceivers in transceivers 454a through 454r, respectively. Each demodulator may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The memories 442 and 482 may store data and program codes for BS 110 and UE 120, respectively. A scheduler 444 may schedule UEs for data transmission on the downlink and/or uplink.

Antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 4, the controller/processor 240 of the BS 110a has a TCI state manager 241 that processes a codebook based uplink transmission in accordance with how the UE processed the codebook based uplink transmission, according to aspects described herein. As shown in FIG. 4, the controller/processor 280 of the UE 120a has a TCI state manager 281 that decides how to process a codebook based uplink transmission based on if a TCI state has a source downlink reference signal (RS), according to aspects described herein. Although shown at the controller/processor, other components of the UE 120a and BS 110a may be used to perform the operations described herein.

Figure 5:
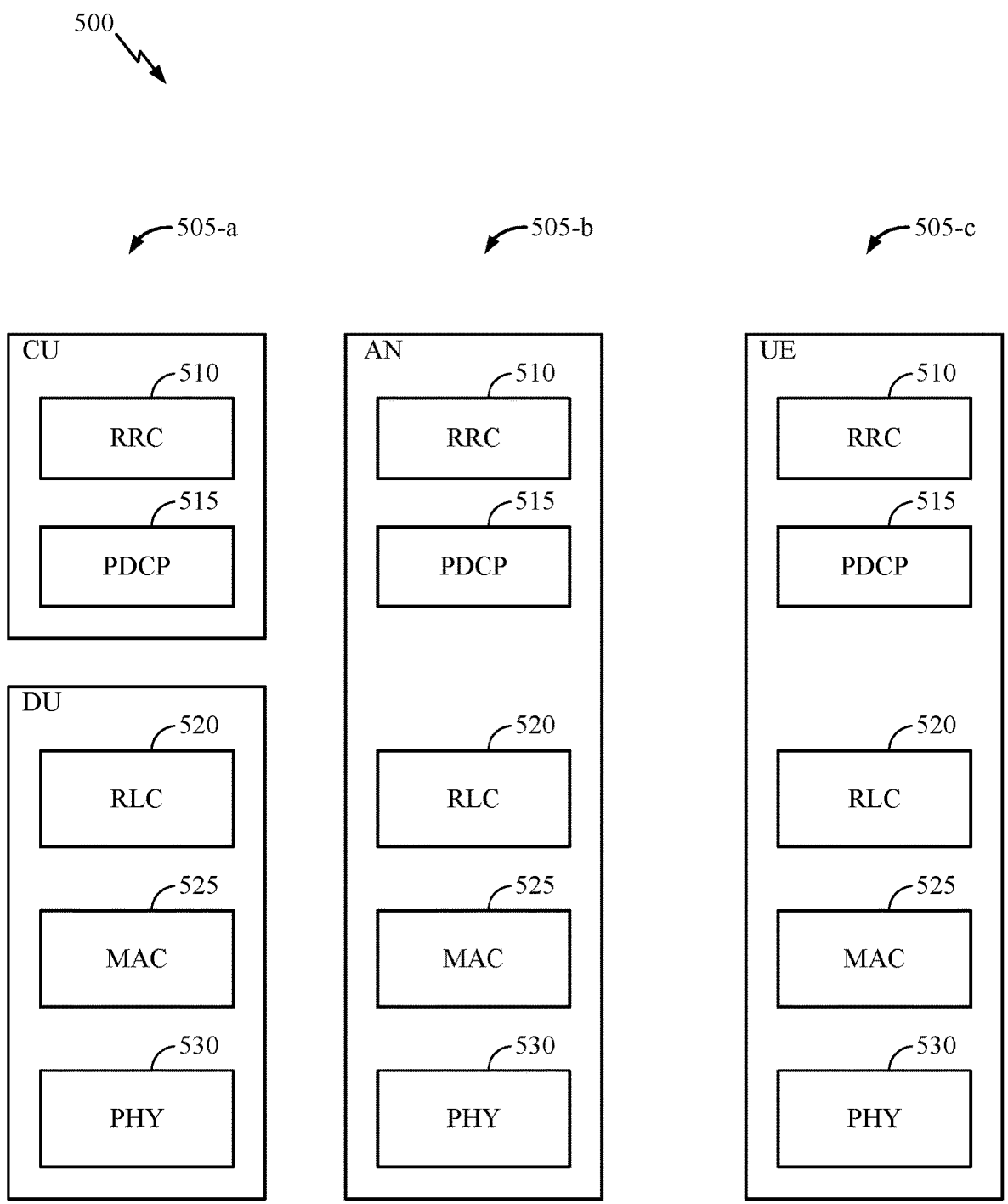
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 6:
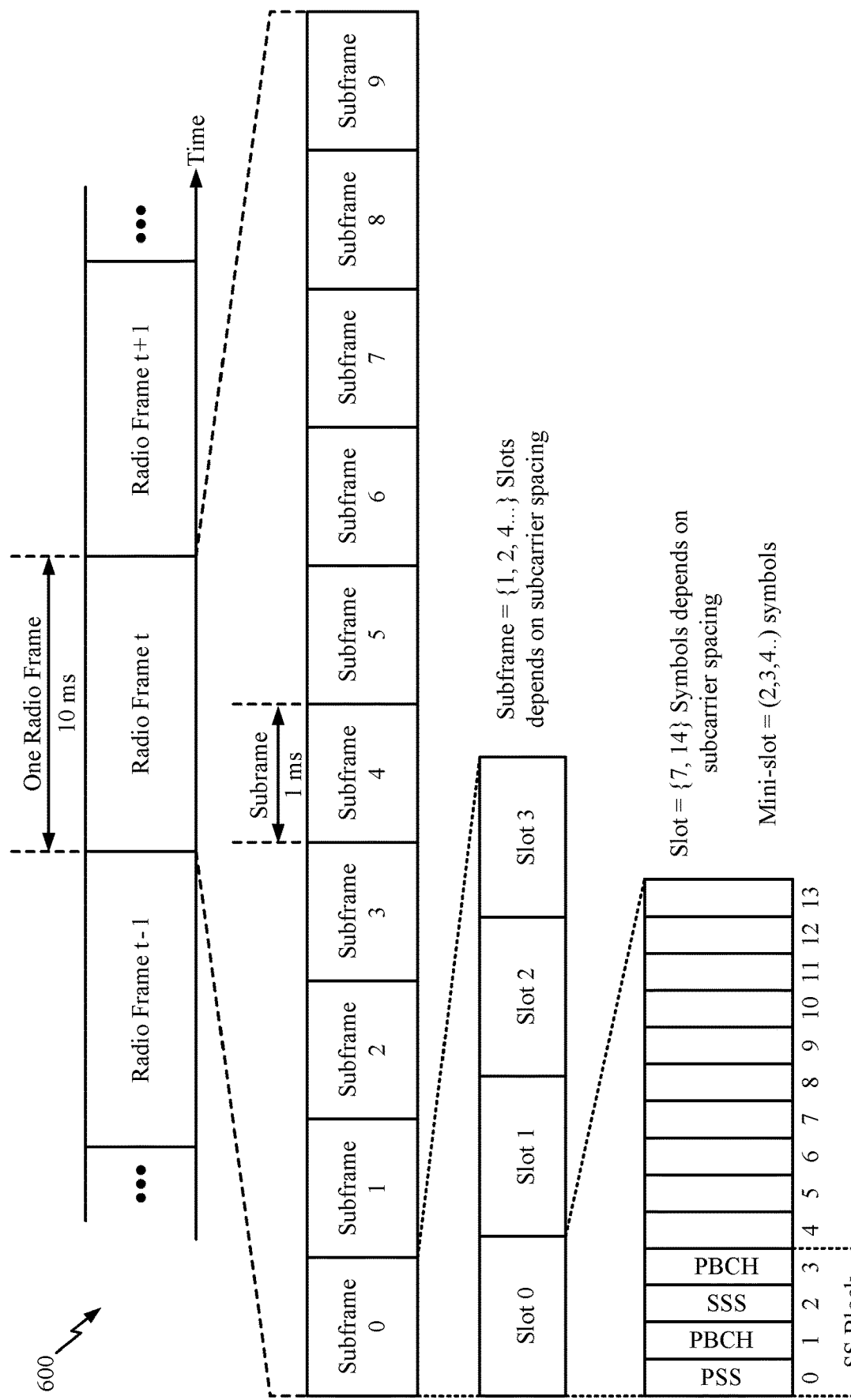
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIB s), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 7:
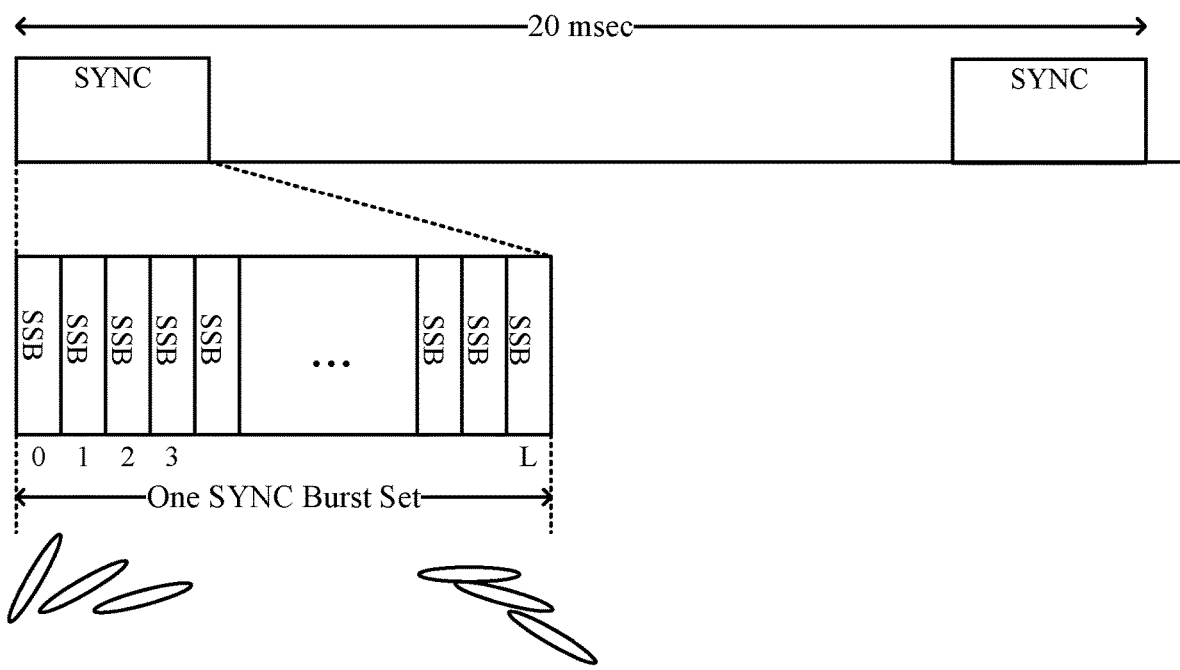
FIG. 7 illustrates how different synchronization signal blocks (SSBs) may be sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Operating characteristics of a gNB in an NR communications system may be dependent on a frequency range (FR) in which the system operates. A frequency range may include one or more operating bands (e.g., "n1" band, "n2" band, "n7" band, and "n41" band, etc.). A communications system (e.g., one or more gNBs and UEs) may operate in one or more operating bands.

A control resource set (CORESET) for an orthogonal frequency division multiple access (OFDMA) system (e.g., a communications system transmitting physical downlink control channel (PDCCH) using OFDMA waveforms) may include one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for (e.g., monitor) control information.

A CORESET may be defined in units of resource element groups (REGs). Each REG may include a fixed number (e.g., twelve) of tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs. A gNB may transmit a NR-PDCCH to a UE in a set of CCEs, called a decoding candidate, within a search space for the UE. The UE may receive the NR-PDCCH by searching (e.g., monitoring) in search spaces and decoding the NR-PDCCH.

During initial access, a UE may identify an initial CORESET (e.g., referred to as CORESET #0) configuration from an indication (e.g., a pdcchConfigSIB1) in a system information (e.g., in a maser information block (MIB) carried in PBCH). This initial CORESET may then be used to configure the UE (e.g., with other CORESETs and/or bandwidth parts via dedicated (UE-specific) signaling). When the UE detects a control channel in the CORESET, the UE attempts to decode the control channel and the UE communicates with the transmitting BS (e.g., the transmitting cell) according to the control information provided in a decoded control channel.

When a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to a synchronization signal block (SSB). From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as the CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
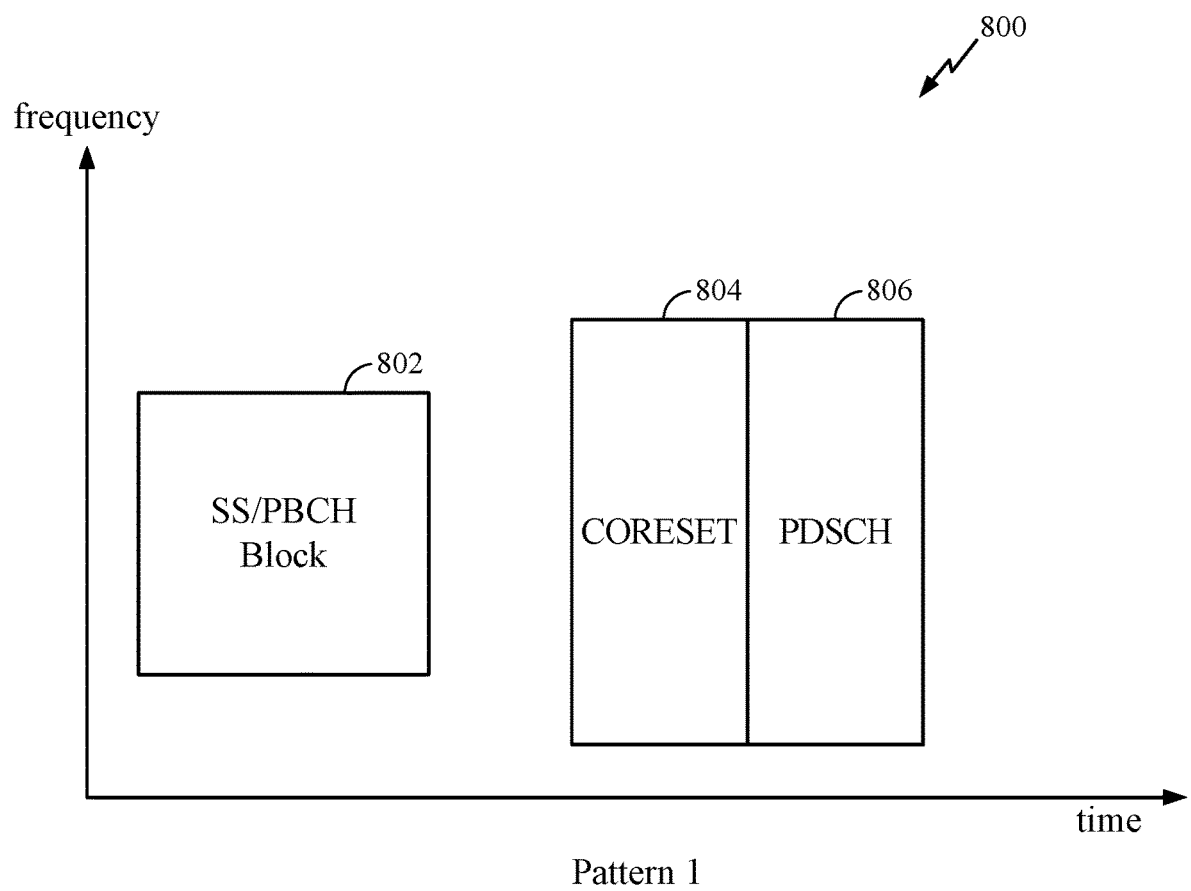
FIG. 8 shows an exemplary transmission resource mapping, according to aspects of the present disclosure.

FIG. 8 shows an example transmission resource mapping 800, according to aspects of the present disclosure. In the exemplary mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS transmits the control signaling in a PDCCH to a UE (e.g., UE 120, shown in FIG. 1) in the (time/frequency resources of the) CORESET 804. The PDCCH may schedule a PDSCH 806. The BS then transmits the PDSCH 806 to the UE. The UE may receive the MIB in the SS/PBCH block 802, determine the index, look up a CORESET configuration based on the index, and determine the CORESET 804 from the CORESET configuration and the SS/PBCH block. The UE may then monitor the CORESET 804, decode the PDCCH in the CORESET 804, and receive the PDSCH 806 that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

As discussed above, aspects of the disclosure relate to uplink transmit beam states using transmission configuration indication (TCI).

It is desirable for a user equipment (UE) to know which assumptions the UE can make on a channel for different transmissions. For example, the UE may need to know which reference signals it can use to estimate the channel in order to decode a transmitted signal (e.g., physical downlink control channel (PDCCH) or physical downlink shared channel (PDSCH)). It may also be important for the UE to be able to report relevant channel state information (CSI) to the base station (BS) (e.g., next generation NodeB (gNB)) for scheduling, link adaptation, and/or beam management purposes. In new radio (NR), the concept of quasi co-location (QCL) and states is used to convey information about these assumptions.

QCL assumptions are generally defined in terms of channel properties. 3GPP TS 38.214 defines QCL as "two antenna ports are said to be quasi-co-located if properties of the channel over which a symbol on one antenna port is conveyed can be inferred from the channel over which a symbol on the other antenna port is conveyed." Different reference signals (RSs) may be considered quasi co-located (QCL'd) if a receiver (e.g., a UE) can apply channel properties determined by detecting a first reference signal to help detect a second signal. TCI states generally include configurations such as QCL-relationships, for example, between the downlink (DL) RSs in one channel state information reference signal (CSI-RS) set and the PDSCH demodulation reference signal (DMRS) ports.

In some cases, a UE may be configured with up to M TCI States. Configuration of the M TCI States may be via higher layer signalling (e.g., a higher layer parameter TCI-States). A UE may be signalled to decode PDSCH according to a detected PDCCH with downlink control information (DCI) indicating one of the TCI states. Each configured TCI state may include one RS set (e.g., by higher layer parameter TCI-RS-SetConfig) that indicates different QCL assumptions between certain source and target signals.

QCL signaling may be provided for RSs and channels across scenarios involving multiple cells, such as in coordinated multipoint (CoMP) scenarios in which multiple transmit receive points (TRPs) or integrated access and backhaul (IAB) nodes each have their own cell ID.

FIG. 9 is a table 900 illustrating examples of the association of DL reference signals with corresponding QCL types that may be indicated by a parameter (e.g., TCI-RS-SetConfig).

The table 900 shows source RSs, target RSs, and QCL type assumptions that may be configured by a valid UL-TCI state configuration. The target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. Examples of source RSs include phase tracking reference signals (PTRSs), SSBs, sounding reference signal (SRS), and/or CSI-RSs (e.g., CSI-RS for beam management). Examples of target RSs include aperiodic tracking reference signals (TRSs), periodic TRSs, PRACHs, PUCCHs, and/or PUSCHs. The QCL types include the QCL types A/B/C/D discussed below.

For the case of two source RSs, the different QCL types can be configured for the same target RS. In the illustrative example, a synchronization signal block (SSB) is associated with Type C QCL for periodic TRS (P-TRS), while CSI-RS for beam management (CSI-RS-BM) is associated with Type D QCL.

QCL types indicated to the UE can be based on a higher layer parameter (e.g., QCL-Type). QCL types may take one or a combination of the following types:
QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter},
Spatial QCL assumptions (QCL-TypeD) may be used to help a UE to select an analog receive (Rx) beam (e.g., during beam management procedures). For example, an SSB resource indicator may indicate a same beam for a previous reference signal should be used for a subsequent transmission.

An information element (e.g., CORESET IE) sent via RRC signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide QCL relationships between DL RS(s) in one RS set (e.g., a TCI-Set) and another signal (e.g., DMRS ports for another transmission). A particular TCI state for a given UE (e.g., for unicast PDCCH) may be conveyed to the UE by a MAC-CE. The TCI state may be selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (e.g., carried in the MIB).

Some deployments (e.g., NR Release 15 and 16 systems) support codebook-based transmission for UL transmissions. Codebook-based UL transmission may be based on BS feedback.

Figure 10:
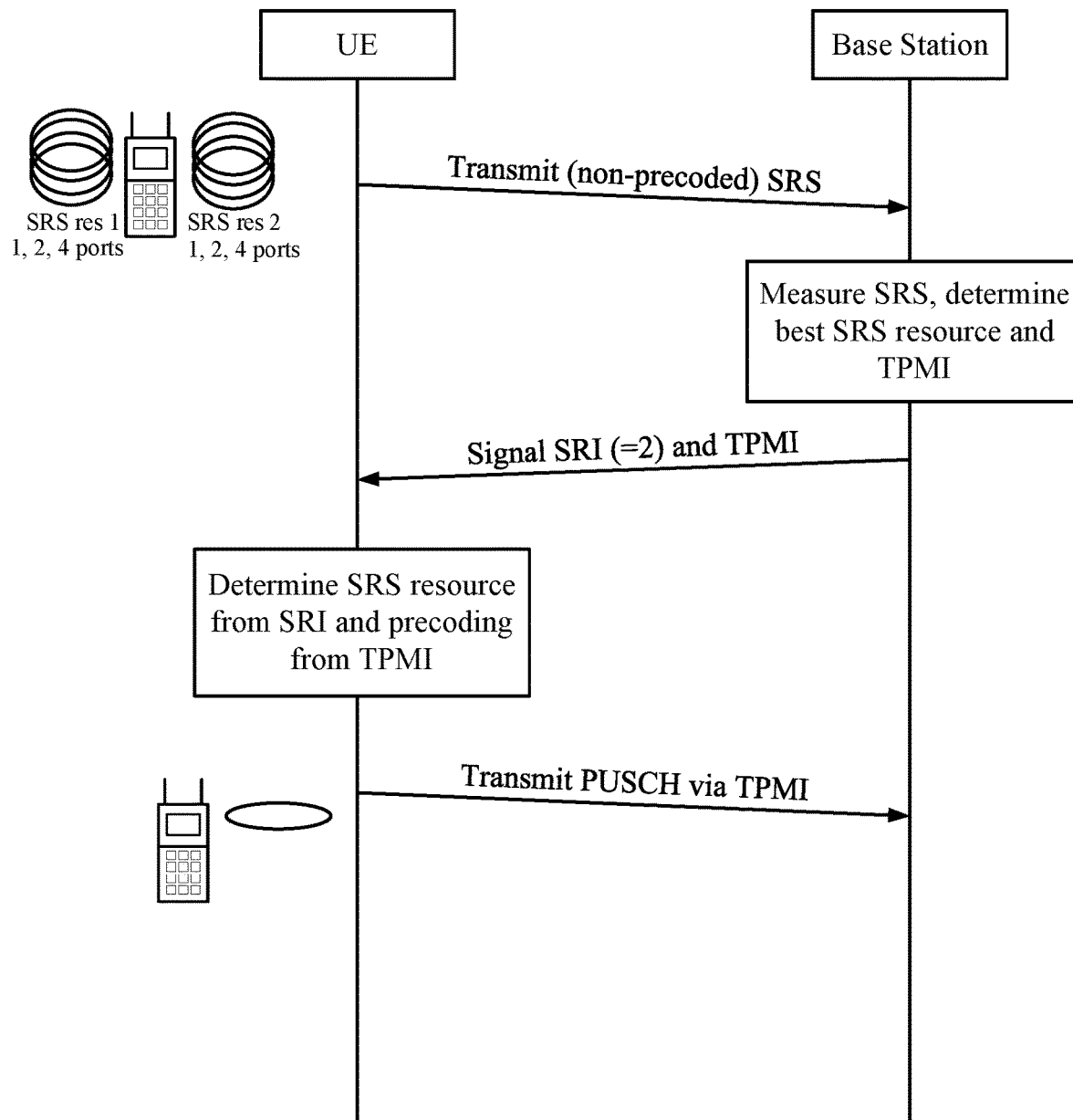
FIG. 10 is a call flow diagram illustrating an example of codebook based UL transmission.

FIG. 10 is a call flow diagram illustrating an example of conventional codebook based UL transmission using a wideband precoder. As illustrated, a UE transmits (non-precoded) SRS with up to 2 SRS resources (with each resource having 1, 2 or 4 ports). The BS measures the SRS and, based on the measurement, selects one SRS resource and a wideband precoder to be applied to the SRS ports within the selected resource.

As illustrated, the BS configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly.

Aspects of the present disclosure relate to techniques for applying uplink TCI states with downlink reference signals to codebook based physical uplink transmissions Example Uplink TCI with Downlink RS to Codebook Based PUSCH Transmissions Aspects of the present disclosure may help apply uplink (UL) transmission configuration indicator (TCI) states to codebook based physical uplink shared channel (PUSCH) transmissions, such as those described above.

As mentioned above, uplink TCI states may provide a mechanism to indicate what parameters to use to (transmit and) decode uplink traffic. The uplink TCI state may have downlink source reference signals (RS) to indicate a beam for uplink PUSCH transmissions, as illustrated in the third row of the FIG. 9, which shows uplink TCI states.

However, without a sounding reference signal (SRS) transmission, the BS may not be able to determine (and indicate) precoding metrics and targeted rank for the uplink TCI codebook for the PUSCH transmission.

According to aspects of the present disclosure, uplink TCI states with downlink RS may be applied to codebook based PUSCH transmissions.

Figure 11:
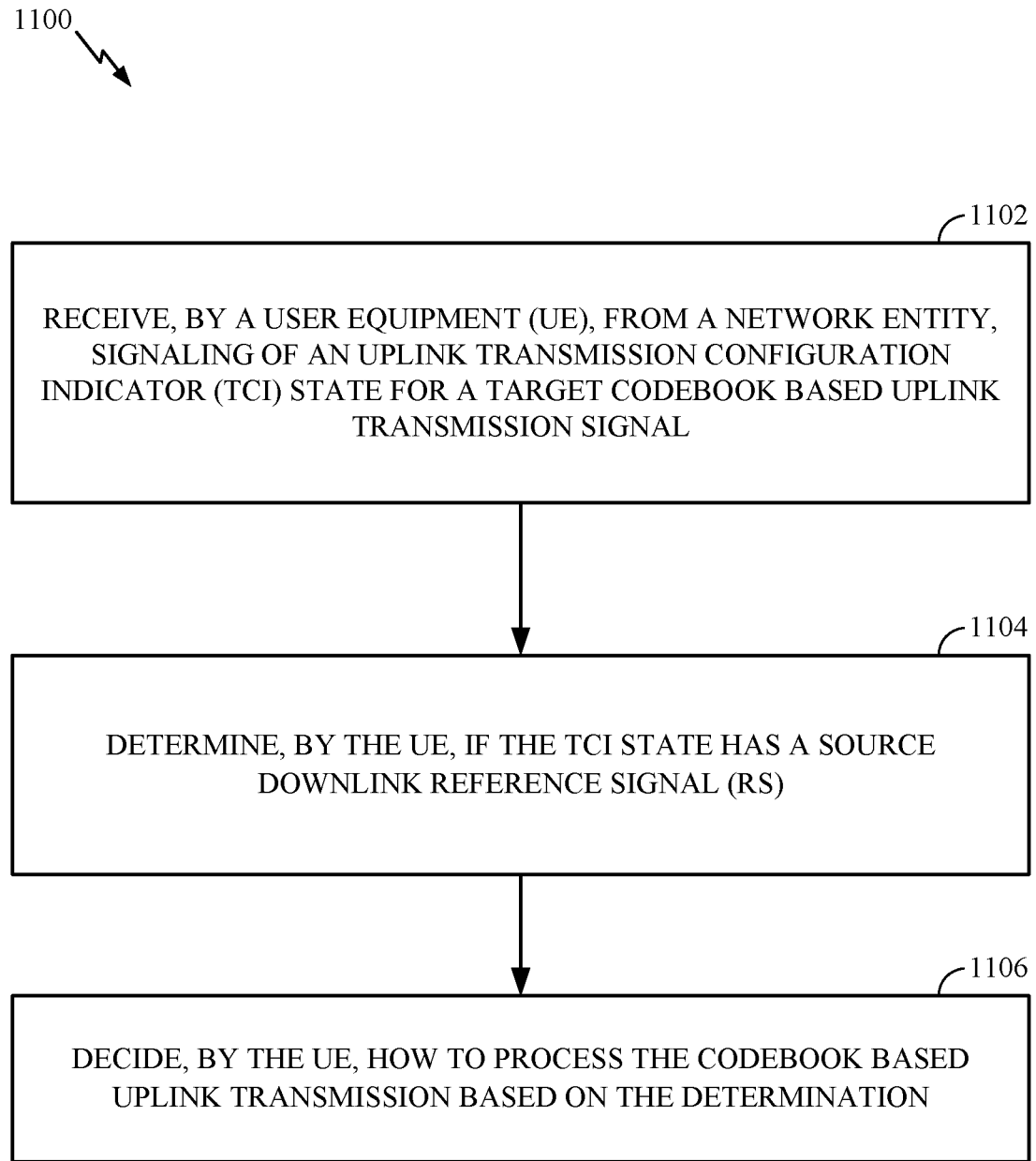
FIG. 11 is a flow diagram illustrating example operations for wireless communications by a user equipment (UE), in accordance with certain aspects of the present disclosure.

FIG. 11 illustrates example operations 1100 for wireless communications by a UE, in accordance with certain aspects of the present disclosure. The operations 1100 may be performed, for example, by a UE (e.g., UE 120*a* in the wireless communication network 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1100 begin, at 1102, by receiving, from a network entity, signaling of an uplink TCI state for a target codebook based uplink transmission signal.

At 1104, the UE determines if the TCI state has a source downlink RS.

At 1106, the UE decides how to process the codebook based uplink transmission based on the determination.

Figure 12:
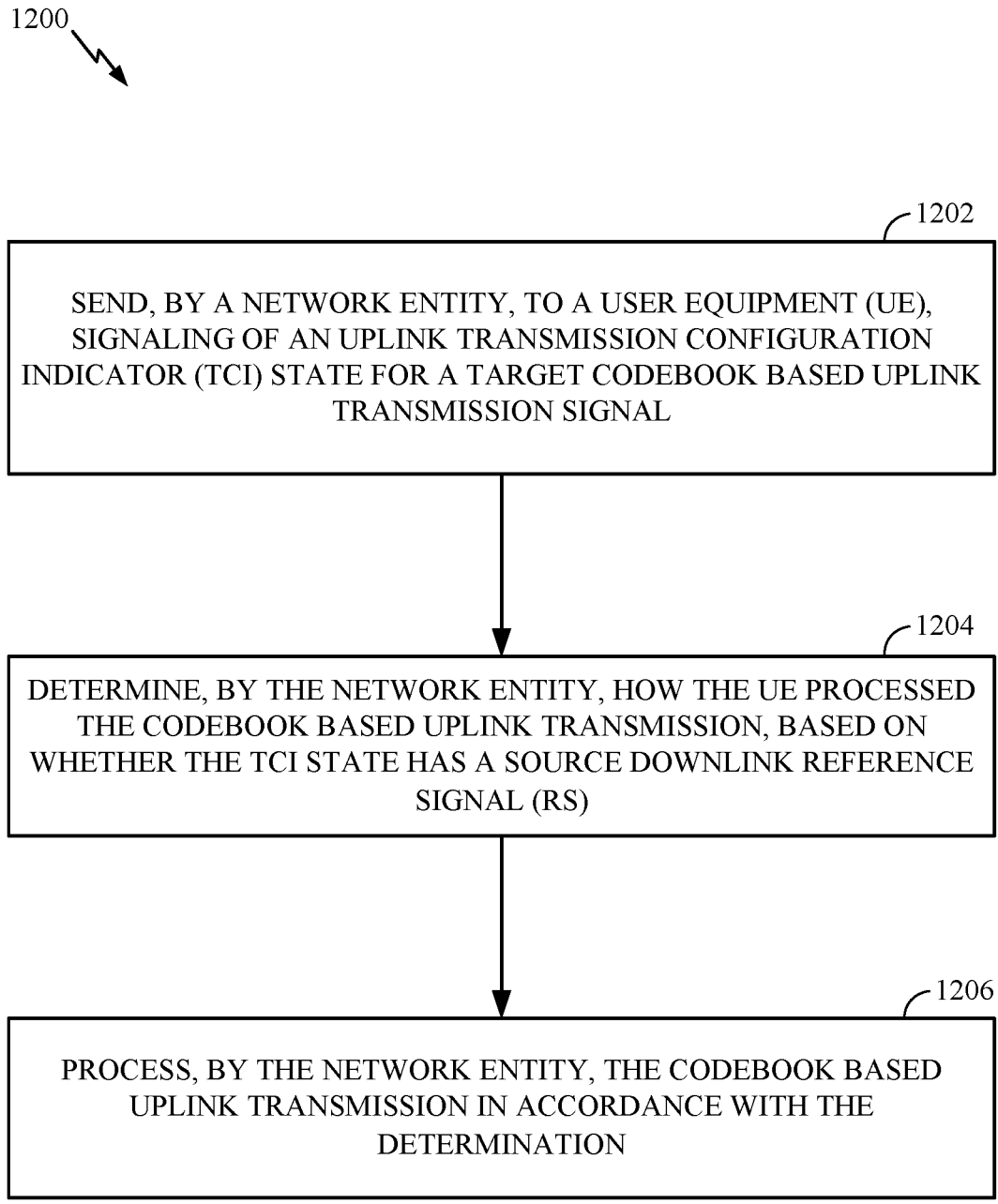
FIG. 12 is a flow diagram illustrating example operations for wireless communications by a network entity, in accordance with certain aspects of the present disclosure.

FIG. 12 illustrates example operations 1200 for wireless communications by a network entity, in accordance with certain aspects of the present disclosure. The operations 1200 may be performed, for example, by a BS (e.g., BS 110*a* in the wireless communication network 100, which may be a gNB). The operations 1200 may be complementary to the operations 1200 performed by the UE. The operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1200 begin, at 1202, by sending, to a user equipment (UE), signaling of an uplink TCI state for a target codebook based uplink transmission signal.

At 1204, the network entity determines how the UE processed the codebook based uplink transmission, based on whether the TCI state has a source downlink RS.

At 1206, the network entity processes the codebook based uplink transmission in accordance with the determination.

In this manner, uplink TCI states with downlink source RS may be applied to codebook based uplink transmissions, such as PUSCH.

In some cases, uplink TCI states with downlink source RS may not be applied to codebook based PUSCH transmissions. Accordingly, for such codebook based PUSCH transmissions, the source RS may be an uplink RS (e.g., SRS) instead.

In some cases, a first downlink RS may be transmitted to the UE before an uplink TCI state with a second downlink RS is transmitted. In this case, the UE may report measurements for transmission rank indication (TRI) and/or transmit precoding matrix indicator (TPMI) determination, based on the first downlink RS.

In such cases, the first downlink RS used for TRI/TPMI determination may be the same as or different from the second downlink RS indicated in the uplink TCI state. The determined TRI/TPMI may be signalled in uplink TCI states. For example, the determined TRI/TPMI are signalled with TCI state when the two downlink RSs are different (and the UE may use the signalled TRI/TPMI).

Otherwise, if the two downlink RSs are of the same type, the determined TRI/TPMI may not need to be signalled (with the UL TCI state) because the UE may in effect learn ("memorize") the TRI/TPMI determined based on the first downlink RS (as it is the same type as the second downlink RS). In some cases, the UE may determine the TRI/TPMI based on the first downlink RS.

If the uplink TCI state indicates the TRI/TPMI parameters to use, then the UE may use those signalled parameters. In an example, a single bit in the downlink control information (DCI) may indicate whether the UE may use the same or different TRI/TPMI parameters.

Figure 13:
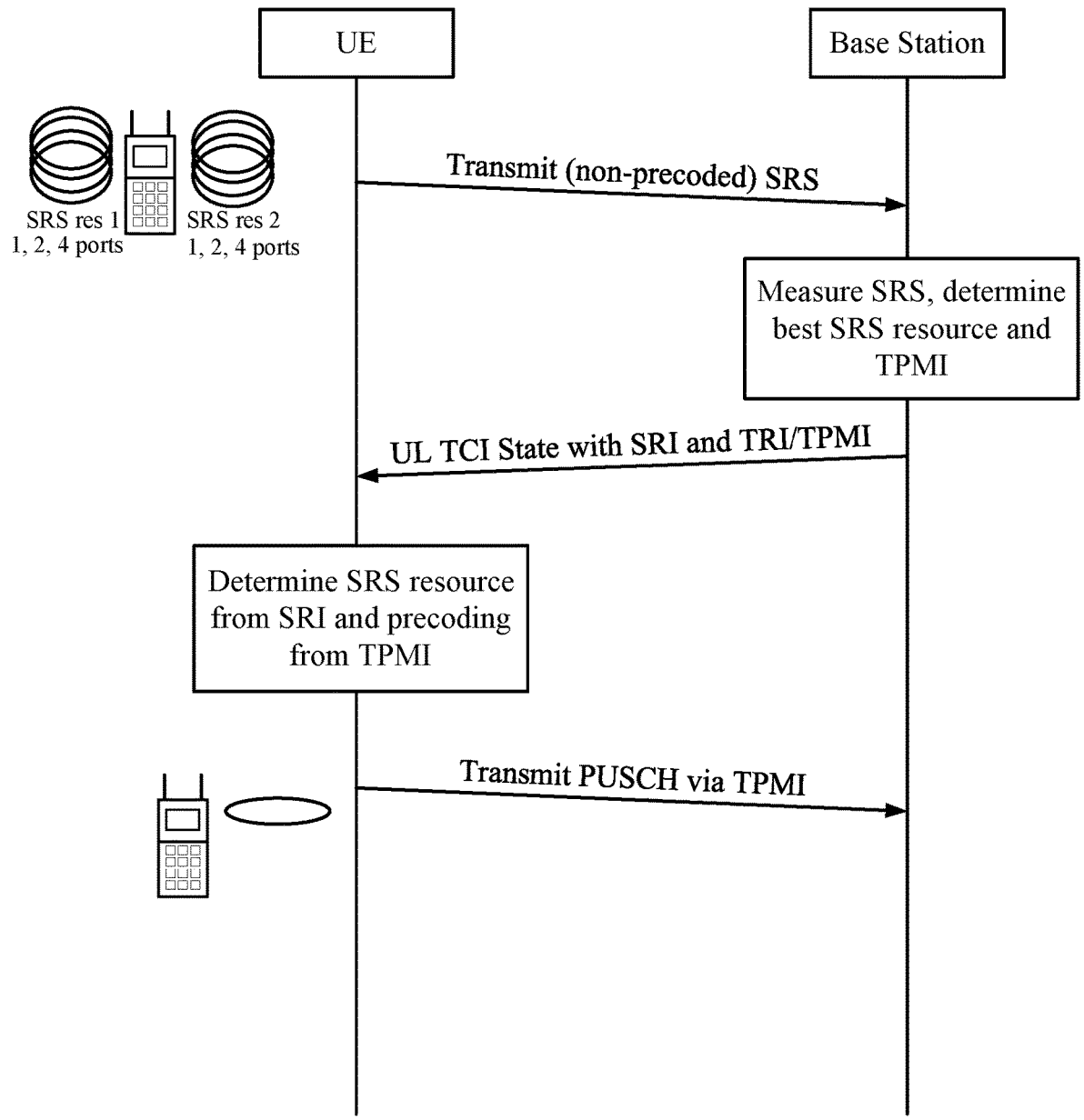
FIG. 13 is a call flow diagram illustrating an example of codebook based UL transmission with uplink TCI states.
Figure 14:
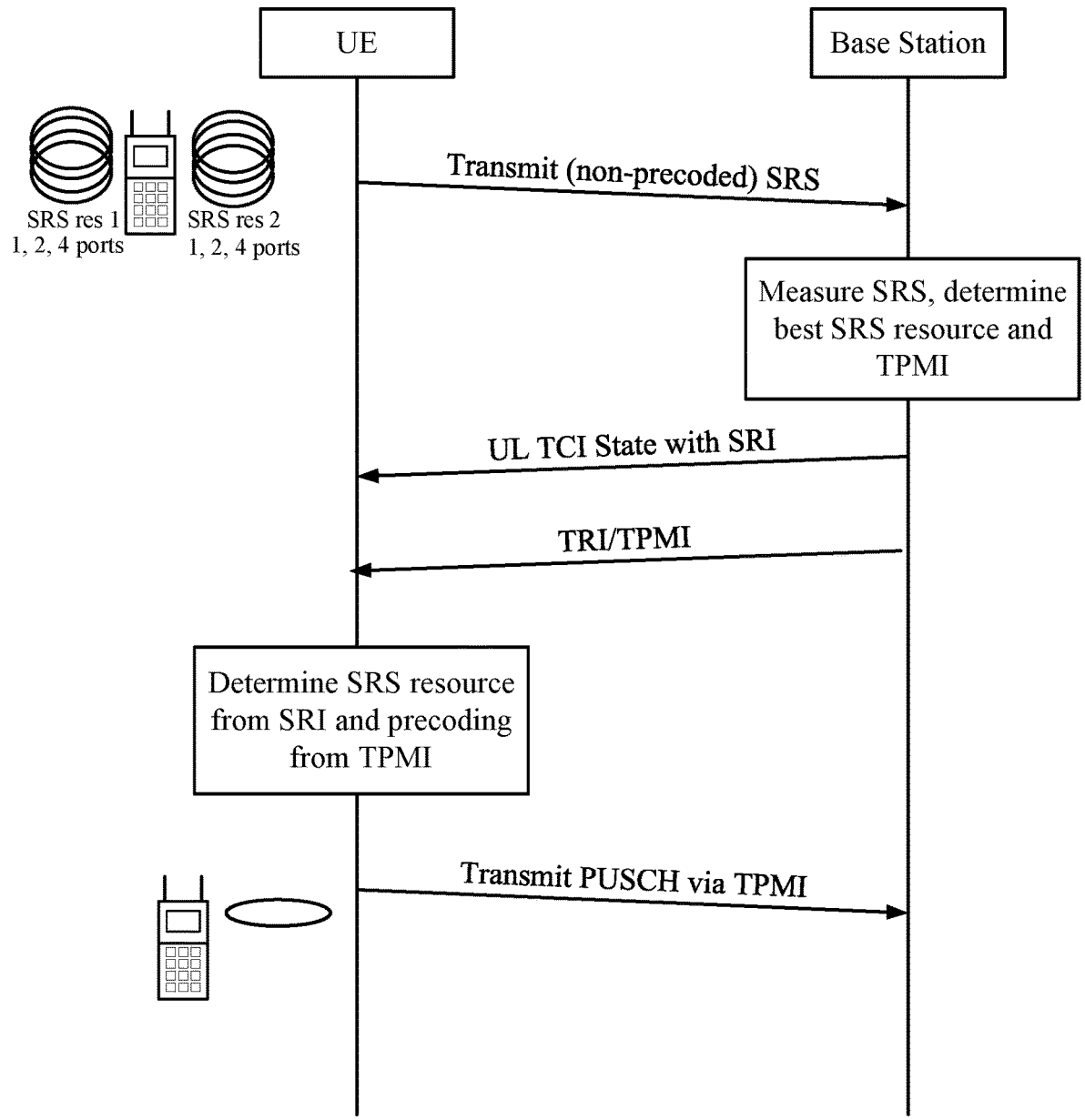
FIG. 14 is a call flow diagram illustrating an example of codebook based UL transmission with uplink TCI states.

In some cases, a SRS resource indictor (SRI) and TRI/TPMI may be transmitted with the uplink TCI state, as shown in FIG. 13 and FIG. 14.

FIG. 13 illustrates a call flow of codebook based PUSCH transmission, similar to FIG. 10. As illustrated, the UE transmits SRS to a BS before an uplink TCI state with the downlink RS. The BS determines TRI/TPMI based on the SRS. The BS may update the uplink TCI state to carry the determined TRI/TPMI, and transmits the uplink TCI state with the downlink RS, the SRI, and the determined TRI/TPMI. The UE may then transmit PUSCH based on the TPMI signalled with the UL TCI state.

As illustrated in FIG. 14, in some cases, the UL TCI and the SRI/TRI/TPMI may be conveyed in different signals. In the illustrated example, the uplink TCI and SRI are indicated in one signal (e.g., via DCI), while the TRI/TPMI is conveyed in a second signal (e.g., via MAC-CE).

Figure 15:
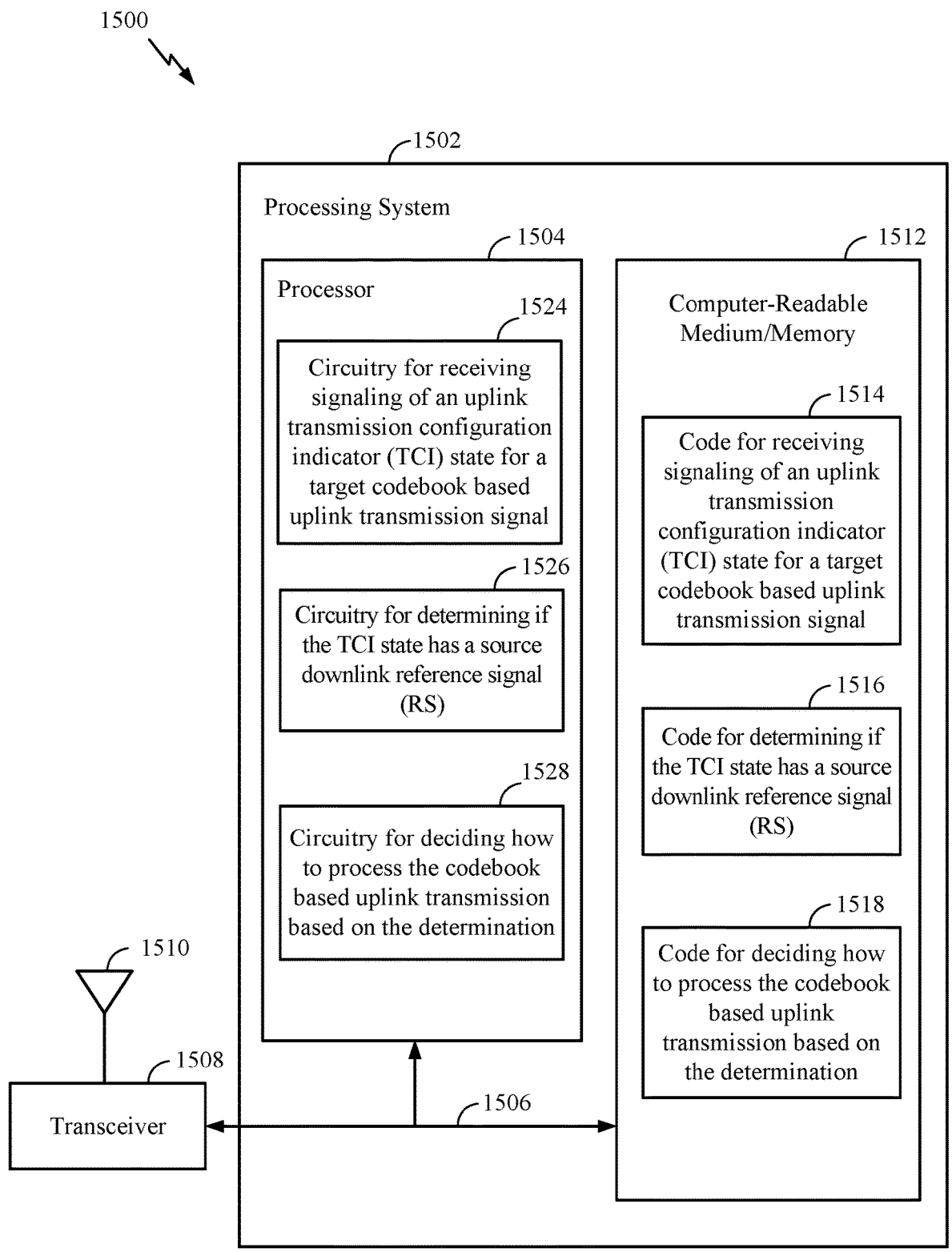
FIG. 15 illustrates a communications device that may include various components configured to perform operations for the techniques disclosed herein in accordance with aspects of the present disclosure.

FIG. 15 illustrates a communications device 1600 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for applying uplink TCI states with downlink reference signals to codebook based PUSCH transmissions. In certain aspects, computer-readable medium/memory 1512 stores code 1514 for receiving, from a network entity, signaling of an uplink TCI state for a target codebook based uplink transmission signal; code 1516 for determining if the TCI state has a source downlink RS; and code 1518 for deciding how to process the codebook based uplink transmission based on the determination. In certain aspects, the processor 1504 has circuitry configured to implement the code stored in the computer-readable medium/memory 1512. The processor 1504 includes circuitry 1524 for receiving, from a network entity, signaling of an uplink TCI state for a target codebook based uplink transmission signal; circuitry 1526 for signaling of an uplink TCI state for a target codebook based uplink transmission signal; code 1515 for determining if the TCI state has a source downlink RS; and circuitry 1528 for deciding how to process the codebook based uplink transmission based on the determination.

For example, means for receiving (or means for obtaining) may include a receiver and/or antenna(s) 252 of the UE 120a illustrated in FIG. 2 and/or circuitry 1524 for receiving, from a network entity, signaling of an uplink TCI state for a target codebook based uplink transmission signal of the communication device 1500 in FIG. 15. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1502 of the communication device 1500 in FIG. 15.

Figure 16:
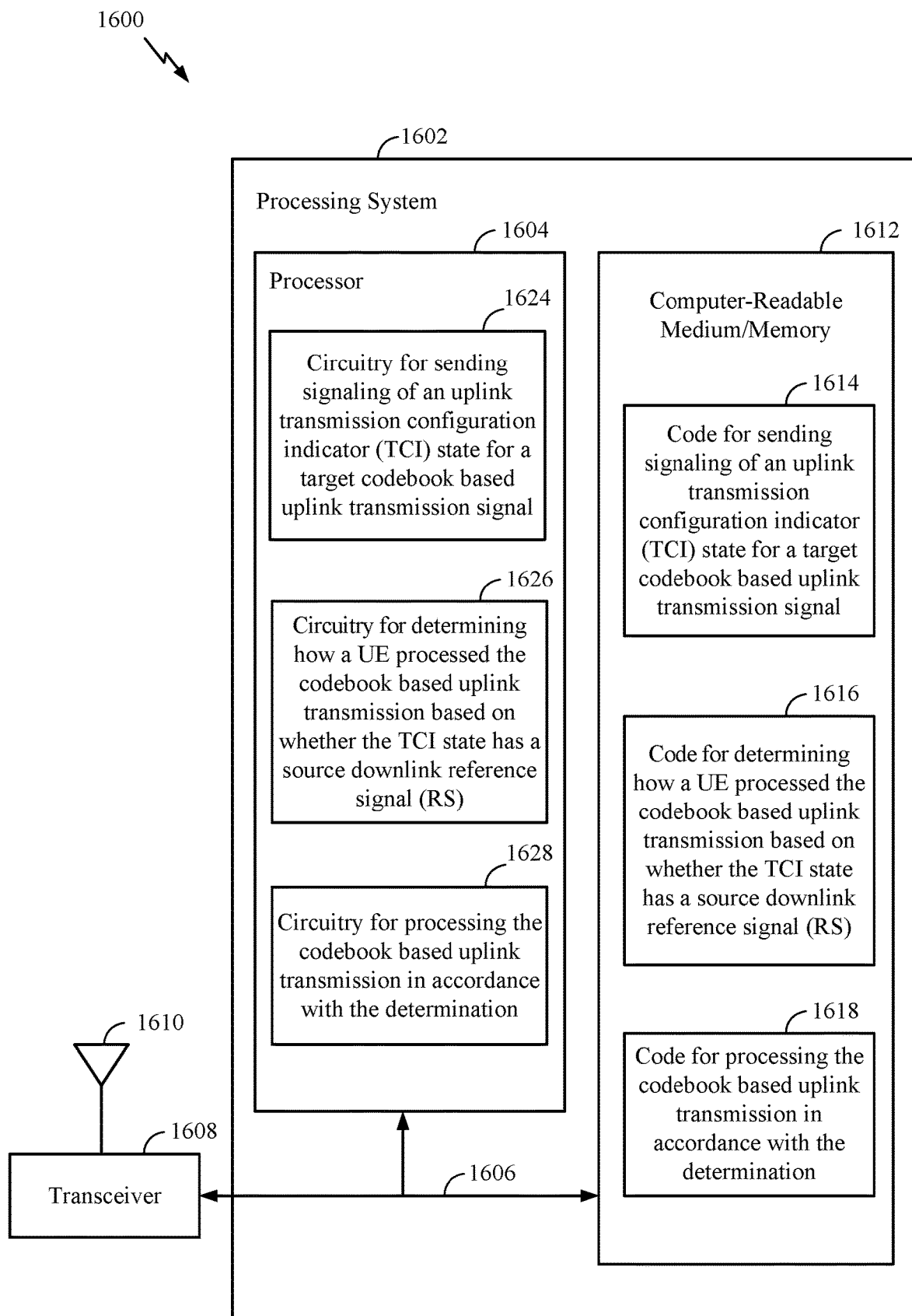
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 12, or other operations for performing the various techniques discussed herein for applying uplink TCI states with downlink reference signals to codebook based PUSCH transmissions. In certain aspects, computer-readable medium/memory 1612 stores code 1614 for sending, to a UE, signaling of an uplink TCI state for a target codebook based uplink transmission signal; code 1616 for determining how the UE processed the codebook based uplink transmission, based on whether the TCI state has a source downlink RS; and code 1618 for processing the codebook based uplink transmission in accordance with the determination. In certain aspects, the processor 1604 has circuitry configured to implement the code stored in the computer-readable medium/memory 1612. The processor 1604 includes circuitry 1624 for sending, to a UE, signaling of an uplink TCI state for a target codebook based uplink transmission signal; circuitry 1626 for determining how the UE processed the codebook based uplink transmission, based on whether the TCI state has a source downlink RS; and circuitry 1628 for processing the codebook based uplink transmission in accordance with the determination.

For example, means for transmitting (or means for outputting for transmission) may include the transmitter unit 254 and/or antenna(s) 252 of the UE 120a illustrated in FIG. 2 and/or circuitry 1624 for sending, to a UE, signaling of an uplink TCI state for a target codebook based uplink transmission signal of the communication device 1600 in FIG. 16. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1602 of the communication device 1600 in FIG. 16.

Example Aspects

In a first aspect, a method of wireless communications by a user equipment (UE), includes: receiving, from a network entity, signaling of an uplink transmission configuration indicator (TCI) state for a target codebook based uplink transmission signal; determining if the TCI state has a source downlink reference signal (RS); and deciding how to process the codebook based uplink transmission based on the determination.

In a second aspect, in combination with the first aspect, the codebook based uplink transmission comprises a physical uplink shared channel (PUSCH).

In a third aspect, in combination with any of the first through second aspects, if the determination is the uplink TCI state has a source downlink RS, the decision is to not apply the TCI state to the codebook based uplink transmission.

In a fourth aspect, in combination with any of the first through third aspects, uplink transmission parameters have been determined based on a first downlink RS prior to receiving the TCI state; the TCI state has a second downlink RS as a source downlink RS; and deciding how to process the codebook based uplink transmission depends, at least in part, if the first downlink RS and second downlink RS are of a same type.

In a fifth aspect, in combination with the fourth aspect, the type of first downlink RS and second downlink RS comprises one of: a first QCL type that indicates QCL assumptions regarding Doppler shift, Doppler spread, average delay, and delay spread; a second QCL type that indicates QCL assumptions regarding Doppler shift and Doppler spread; a third QCL type that indicates Doppler shift and average delay; and a fourth QCL type that indicates QCL assumptions regarding spatial relations.

In a sixth aspect, in combination with any of the fourth and fifth aspects, n the decision is to use the previously determined transmission parameters if the first and second downlink RS are the same type.

In a seventh aspect, in combination with any of the fourth through sixth aspects, the decision is to use transmission parameters signaled with the uplink TCI state if the first and second downlink RS are of different types.

In an eighth aspect, in combination with the seventh aspect, the uplink transmission parameters are indicated in the UL TCI in addition to the source downlink RS.

In a ninth aspect, in combination with any of the fourth through eighth aspects, the method further includes determining the uplink transmission parameters based on a first downlink RS prior to receiving the TCI state.

In a tenth aspect, in combination with any of the fourth through ninth aspects, the first and the second downlink RS are the same downlink RS.

In a eleventh aspect, in combination with any of the first through tenth aspects, the method further includes transmitting sounding reference signals (SRS) to the network entity prior to receiving the uplink TCI state; and receiving uplink transmission parameters from the network entity based on the SRS; wherein the decision is to apply the uplink transmission parameters and UL TCI state for the codebook based uplink transmission.

In a twelfth aspect, in combination with the eleventh aspect, at least some of the uplink transmission parameters are signaled separately from the UL TCI state.

In a thirteenth aspect, in combination with any of the eleventh and twelfth aspects, the uplink transmission parameters are indicated in the UL TCI in addition to the source downlink RS.

In a fourteenth aspect, in combination with any of the fourth through thirteenth aspects, the uplink transmission parameters comprise at least one of a transmission rank indication (TM), transmit precoding matrix indicator (TPMI), or SRS resource indicator (SRI).

In a fifteenth aspect, a method of wireless communications by a network entity, includes: sending, to a user equipment (UE), signaling of an uplink transmission configuration indicator (TCI) state for a target codebook based uplink transmission signal; determining how the UE processed the codebook based uplink transmission, based on whether the TCI state has a source downlink reference signal (RS); and processing the codebook based uplink transmission in accordance with the determination.

In a sixteenth aspect, in combination with the fifteenth aspect, the codebook based uplink transmission comprises a physical uplink shared channel (PUSCH).

In a seventeenth aspect, in combination with the fifteenth and sixteenth aspects, if the uplink TCI state has a source downlink RS, the determination is that the UE did not apply the TCI state to the codebook based uplink transmission.

In an eighteenth aspect, in combination with any of the fifteenth through seventeenth aspects, uplink transmission parameters have been determined based on a first downlink RS prior to sending the TCI state; the TCI state has a second downlink RS as a source downlink RS; and determining how the UE processed the codebook based uplink transmission depends, at least in part, if the first downlink RS and second downlink RS are of a same type.

In a nineteenth aspect, in combination with the eighteenth aspect, the type of first downlink RS and second downlink RS comprises one of: a first QCL type that indicates QCL assumptions regarding Doppler shift, Doppler spread, average delay, and delay spread; a second QCL type that indicates QCL assumptions regarding Doppler shift and Doppler spread; a third QCL type that indicates Doppler shift and average delay; and a fourth QCL type that indicates QCL assumptions regarding spatial relations.

In a twentieth aspect, in combination with any of the eighteenth through nineteenth aspects, the determination is the UE used the previously determined transmission parameters if the first and second downlink RS are the same type.

In a twenty-first aspect, in combination with any of the eighteenth through twentieth aspects, the determination is the UE used transmission parameters signaled with the uplink TCI state if the first and second downlink RS are of different types.

In a twenty-second aspect, in combination with the twenty-first aspect, the network entity indicates the uplink transmission parameters in the uplink TCI in addition to the source downlink RS.

In a twenty-third aspect, in combination with any of the eighteenth through twenty-second aspects, the UE determines the uplink transmission parameters based on a first downlink RS prior to receiving the TCI state.

In a twenty-fourth aspect, in combination with any of the eighteenth through twenty-third aspects, the first and the second downlink RS are the same downlink RS.

In a twenty-fifth aspect, in combination with any of the fifteenth through twenty-fourth aspects, the method further includes: receiving sounding reference signals (SRS) from the UE prior to sending the uplink TCI state; and transmitting uplink transmission parameters to the UE based on the SRS; wherein the determination is the UE applied the uplink transmission parameters and UL TCI state for the codebook based uplink transmission.

In a twenty-sixth aspect, in combination with the twenty-fifth aspect, at least some of the uplink transmission parameters are signaled separately from the UL TCI state.

In a twenty-seventh aspect, in combination with any of the twenty-fifth and twenty-sixth aspects, the uplink transmission parameters are indicated in the UL TCI in addition to the source downlink RS.

In a twenty-eighth aspect, in combination with any of the eighteenth through twenty-seventh aspects, the uplink transmission parameters comprise at least one of a transmission rank indication (TM), transmit precoding matrix indicator (TPMI), or SRS resource indicator (SRI).

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier or transmission reception point (TRP) may be used interchangeably.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus of wireless communications, comprising:
at least one processor; and
memory coupled to the at least one processor, the memory comprising code executable by the at least one processor to cause the apparatus to:
receive, from a network entity, signaling of an uplink transmission configuration indicator (TCI) state for a target codebook based uplink transmission;
determine uplink transmission parameters;
determine if the TCI state has a source downlink reference signal (RS); and
decide whether to apply at least one of the uplink transmission parameters or the TCI state to the codebook based uplink transmission based on the determination.

2. The apparatus of claim 1, wherein the codebook based uplink transmission comprises a physical uplink shared channel (PUSCH).

3. The apparatus of claim 1, wherein:
the uplink transmission parameters are determined based on a first downlink RS prior to receiving the TCI state;
the TCI state has a second downlink RS as a source downlink RS; and
deciding whether to apply at least one of the uplink transmission parameters or the TCI state to the codebook based uplink transmission depends, at least in part, on the first downlink RS and the second downlink RS.

4. The apparatus of claim 3, wherein a type of at least one of the first downlink RS or the second downlink RS comprises at least one of:
a first QCL type that indicates QCL assumptions regarding Doppler shift, Doppler spread, average delay, and delay spread;
a second QCL type that indicates QCL assumptions regarding Doppler shift and Doppler spread;
a third QCL type that indicates Doppler shift and average delay; or
a fourth QCL type that indicates QCL assumptions regarding spatial relations.

5. The apparatus of claim 3, wherein the decision is to use previously determined transmission parameters if the first and second downlink RS are a same type.

6. The apparatus of claim 3, wherein:
the transmission parameters are received from the network entity; and
the decision is to use the transmission parameters if the first and second downlink RS are of different types.

7. The apparatus of claim 3, wherein the uplink transmission parameters are determined based on a first downlink RS prior to receiving the TCI state.

8. The apparatus of claim 1, wherein the code is executable by the at least one processor to further cause the apparatus to:
transmit sounding reference signals (SRS) to the network entity; and
receive the uplink transmission parameters from the network entity based on the SRS,
wherein the decision is to apply the uplink transmission parameters and UL TCI state for the codebook based uplink transmission.

9. The apparatus of claim 8, wherein at least some of the uplink transmission parameters are signaled separately from the UL TCI state.

10. The apparatus of claim 1, wherein the uplink transmission parameters comprise at least one of a transmission rank indication (TM), transmit precoding matrix indicator (TPMI), or SRS resource indicator (SRI).

11. An apparatus of wireless communications, comprising:
at least one processor; and
memory coupled to the at least one processor, the memory comprising code executable by the at least one processor to cause the apparatus to:
send, to a user equipment (UE), signaling of an uplink transmission configuration indicator (TCI) state for a target codebook based uplink transmission;
determine whether the UE applied at least one of uplink transmission parameters or the TCI state to the codebook based uplink transmission, based on whether the TCI state has a source downlink reference signal (RS); and
process the codebook based uplink transmission in accordance with the determination.

12. The apparatus of claim 11, wherein the codebook based uplink transmission comprises a physical uplink shared channel (PUSCH).

13. The apparatus of claim 11, wherein:
the uplink transmission parameters are determined based on a first downlink RS prior to sending the TCI state;
the TCI state has a second downlink RS as a source downlink RS; and
determining whether the UE applied at least one of the uplink transmission parameters or the TCI state to the codebook based uplink transmission depends, at least in part, on the first downlink RS and the second downlink RS.

14. The apparatus of claim 13, wherein a type of at least one of the first downlink RS or the second downlink RS comprises at least one of:
a first QCL type that indicates QCL assumptions regarding Doppler shift, Doppler spread, average delay, and delay spread;
a second QCL type that indicates QCL assumptions regarding Doppler shift and Doppler spread;
a third QCL type that indicates Doppler shift and average delay; or
a fourth QCL type that indicates QCL assumptions regarding spatial relations.

15. The apparatus of claim 13, wherein the determination is that the UE used previously determined transmission parameters if the first and second downlink RS are a same type.

16. The apparatus of claim 13, wherein:
the transmission parameters are transmitted from the apparatus; and
the determination is the UE used the transmission parameters if the first and second downlink RS are of different types.

17. The apparatus of claim 11, wherein the code is executable by the at least one processor to further cause the apparatus to:
receive sounding reference signals (SRS) from the UE; and
transmit the uplink transmission parameters to the UE based on the SRS, wherein the determination is the UE applied the uplink transmission parameters and UL TCI state for the codebook based uplink transmission.

18. The apparatus of claim 17, wherein at least some of the uplink transmission parameters are signaled separately from the UL TCI state.

19. The apparatus of claim 11, wherein the uplink transmission parameters comprise at least one of a transmission rank indication (TM), transmit precoding matrix indicator (TPMI), or SRS resource indicator (SRI).

20. A method for wireless communications at a user equipment, comprising:
receiving, from a network entity, signaling of an uplink transmission configuration indicator (TCI) state for a target codebook based uplink transmission;
determining uplink transmission parameters;
determining if the TCI state has a source downlink reference signal (RS); and
deciding whether to apply at least one of the uplink transmission parameters or the TCI state to the codebook based uplink transmission based on the determination.

* * * * *